United States Patent
Wenstrand

(10) Patent No.: US 8,353,260 B1
(45) Date of Patent: Jan. 15, 2013

(54) COMBINATION FEEDER AND PESTICIDE APPLICATOR

(75) Inventor: Thomas Wenstrand, Mt. Pleasant, IA (US)

(73) Assignee: Hawkeye Steel Products, Inc., Houghton, IA (US)

( * ) Notice: Subject to any disclaimer, the term of this patent is extended or adjusted under 35 U.S.C. 154(b) by 0 days.

(21) Appl. No.: 13/103,711

(22) Filed: May 9, 2011

(51) Int. Cl.
*A01K 5/00* (2006.01)
*A01K 29/00* (2006.01)

(52) U.S. Cl. .......................... 119/657; 119/650; 119/656

(58) Field of Classification Search .............. 119/61.53, 119/650, 656–657, 660–662
See application file for complete search history.

(56) References Cited

U.S. PATENT DOCUMENTS

| | | | | |
|---|---|---|---|---|
| 882,985 | A * | 3/1908 | Wilson | 119/660 |
| 1,095,471 | A * | 5/1914 | Sheldon | 119/652 |
| 2,709,988 | A * | 6/1955 | Hatcher | 119/62 |
| 3,187,722 | A | 6/1965 | Gilmore et al. | |
| 3,821,940 | A | 7/1974 | Mann | |
| 3,941,096 | A * | 3/1976 | Mann | 119/657 |
| 4,023,533 | A | 5/1977 | Mann | |
| 4,303,040 | A * | 12/1981 | Mann | 119/62 |
| D347,303 | S | 5/1994 | Mann | |
| 5,357,902 | A * | 10/1994 | Norval et al. | 119/657 |
| 5,367,983 | A * | 11/1994 | Pound et al. | 119/53 |
| 5,630,375 | A | 5/1997 | Mann | |
| 5,911,196 | A * | 6/1999 | Simmons et al. | 119/651 |
| 6,899,058 | B2 * | 5/2005 | Burridge et al. | 119/651 |
| 7,950,351 | B2 * | 5/2011 | Mann | 119/660 |
| 2007/0272164 | A1 | 11/2007 | Mann | |
| 2008/0127903 | A1 | 6/2008 | Mann | |

OTHER PUBLICATIONS

Dan Goehl, DVM, Keep Flies from Bugging Your Herd, www.agweb.com.
www.phwhite.com, product descriptions, P.H. White Co., Dyersburg, Tennessee.
www.flykillerkover.com, product description, F&B Mann Products, LLC, Waterville, Kansas.

* cited by examiner

*Primary Examiner* — David Parsley
(74) *Attorney, Agent, or Firm* — Brett D. Papendick; Shuttleworth & Ingersoll, PLC

(57) ABSTRACT

A combination feeder and pesticide applicator for animals in which the animal receives an application of a pesticide when it manipulates the feeder. The feeder has a feeding compartment covered by a lid which can be selectively manipulated to expose food in the feeder. The lid has an applicator such as a cattle rub attached to it through a webbing weaved in and out of a plurality of slots on the lid. The ends of the webbing are clamped together. The ends of the cattle rub are also clamped to one another. A secondary attachment mechanism can be used to further secure the cattle rub to the lid, which prevents the animal from dislodging the cattle rub from the lid.

11 Claims, 5 Drawing Sheets

COMBINATION FEEDER AND PESTICIDE APPLICATOR

BACKGROUND

Flies, particularly face flies, are a problem for livestock producers. The face flies tend to gather around the eyes and nose of cattle leading to disease such as pinkeye. In an effort to avoid the flies, the cattle exhibit behaviors including bunching, seeking shade, and seeking water. These behaviors can lead to reduced milk production and an inability to gain weight.

The cattle industry has attempted to combat the problems caused by the face fly and other pests by exposing the cattle to certain pesticides. The pesticides can be applied through a variety of ways, including fly tags, pour-on products, and applicators used in conjunction with feeders. The fly tags are typically attached to the ears of cattle and must be replaced annually. The process of changing the tags is labor and time intensive. Similarly, pour-on products can require rounding up of the cattle and dispersing the pesticide on each animal.

Attempts have been made to develop products which reduce the time and effort needed to apply the pesticide to the cattle. Applying the pesticide during periods of feeding or by using strategically placed cattle rubs can diminish the time and expense associated with other methods. The cattle can avoid certain cattle rubs, leaving them with little to no protection from the flies. Additions to cattle feeders are prone to damage by the cattle which leads to the need for replacement of the applicators on certain feeders.

SUMMARY OF THE INVENTION

A combination feeder and pesticide applicator which can endure the abuse of cattle while effectively applying pesticide during the times the cattle feeds. A feeding compartment has a lid attached to it such that the lid can be manipulated by an animal to expose and access some type of feed material.

The periphery of the lid has a cattle rub attached to it via a combination of mechanisms. The attachment mechanisms can include a webbing and/or heavy duty zip ties which serve to maintain the cattle rub on the lid despite rough treatment by an animal such as a head of cattle. The webbing is weaved through a plurality of slots in the lid and around the cattle rub. The ends of the webbing are then joined together with a clamp or some other suitable device. The zip ties can also make use of the slots occupied by the webbing and be wrapped around a portion of the cattle rub. The ends of the cattle rub are each knotted and then clamped together such that the rub forms a complete circle around the periphery of the underside of the lid.

The cattle rub is treated with a pesticide or other chemical to prevent pests such as face flies. As the animal manipulates the lid of the feeder/applicator, it receives a quantity of pesticide as the animal is forced to make contact with the cattle rub portion of the device. The cattle rub can be recharged with pesticide as well as be removed if required.

DETAILED DESCRIPTION

Figure 1:
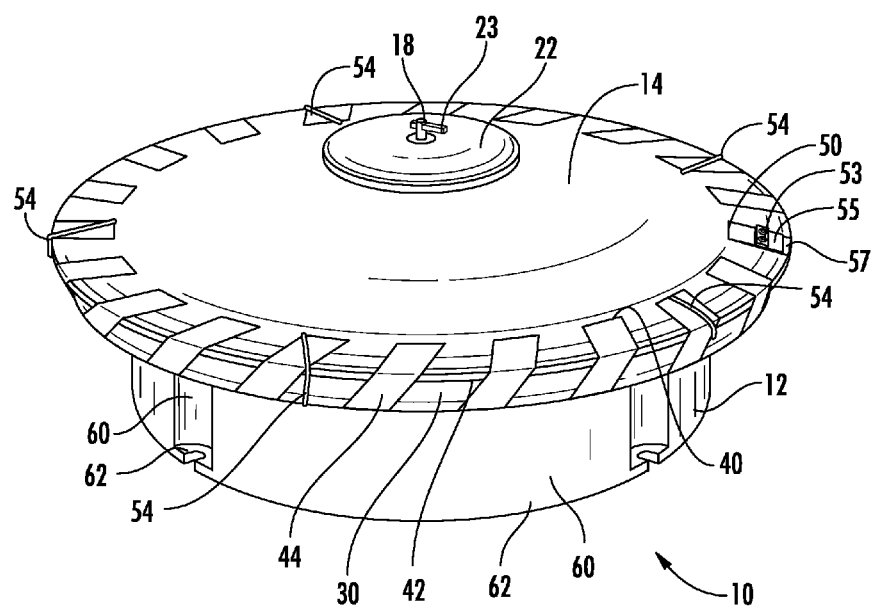
FIG. 1 is a perspective view of the invention.

Now referring to the drawings, FIG. 1 shows the preferred embodiment of the invention. A combination feeder and pesticide applicator 10 comprises a feeding container 12 and a lid 14. Although the container 12 and lid 14 can be a variety of shapes, preferably both have a circular shape. The lid 14 is circular and the container 12 is cylindrical.

Figure 3:
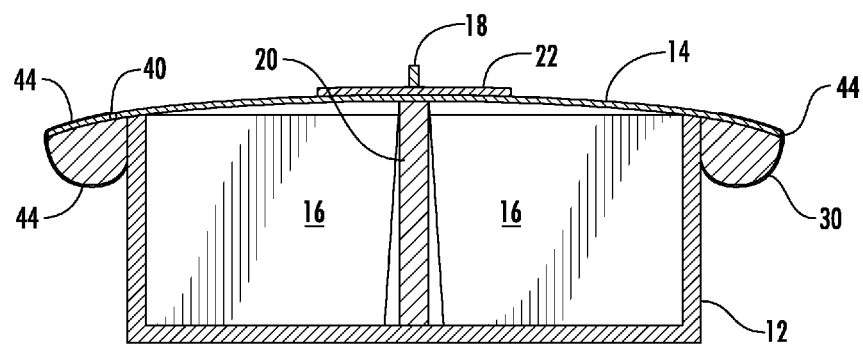
FIG. 3 is a cross-sectional view taken on the line 3-3 of FIG. 2.

As seen in FIG. 3, the container 12 has sections 16 devoted to the storage of feed or other material such as minerals. The lid 14 overhangs the top edge of the container 12 a sufficient distance that an animal can manipulate the lid 14. The lid 14 is preferably made of a pliable material such as rubber or some type of thermoplastic. A post 20 within the container 12, preferably in the center of the container 12, includes an opening for receiving a link pin 18. An opening in the lid 14 corresponds to the link pin 18 such that the link pin 18 will protrude upwardly through the lid 14 when the lid 14 is placed on the container 12. In order to further secure the lid 14 to the container 12 a lid retainer 22 can be placed on top of the lid 14. Preferably the retainer 22 is made of a less flexible material than the lid 14, and is centered over the lid 14 with the link pin 18 protruding through the retainer 22. A selectively removable fastener 23 such as a nut, ring pin or pin can then be attached to the link pin 18 to further secure the lid 14 to the container 12.

Figure 2:
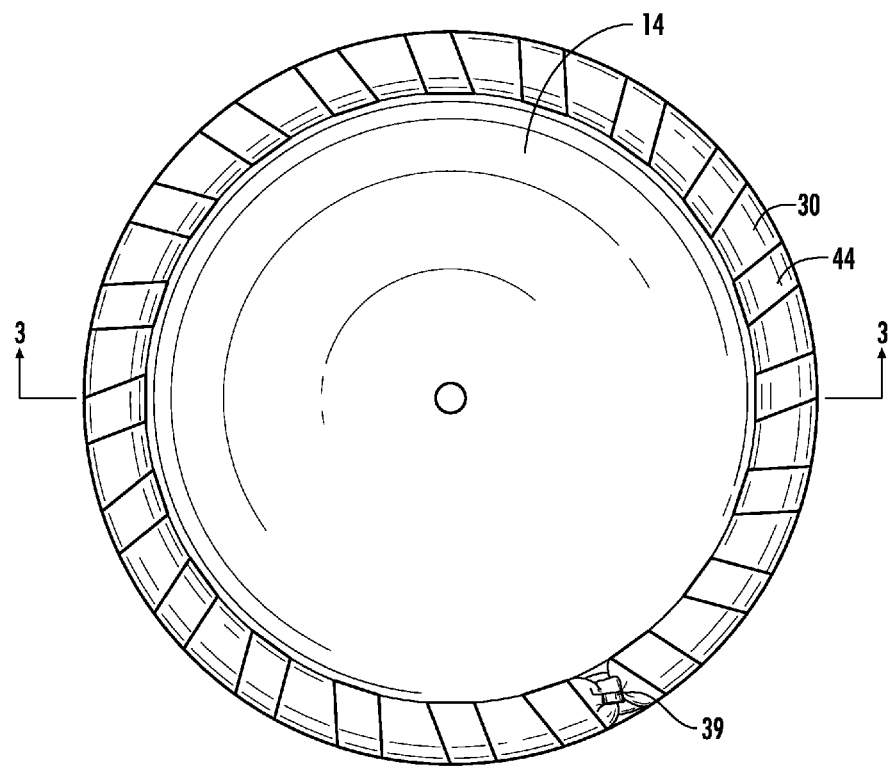
FIG. 2 is a bottom view of the lid.

Again referring to FIG. 3, the lid 14 has an applicator 30 at the periphery of the lid 14, preferably located on the underside of the lid 14. The applicator 30 contains a suitable pesticide directed at a particular pest or set of pests. The applicator 30 can be what is known as a cattle rub in the cattle industry. The applicator 30 is preferably cylindrical and has a first end 36 and a second end 38. The two ends 36 and 38 are each knotted and then clamped together with a sufficient clamping mechanism 39 (see FIG. 2). Once clamped, the applicator 30 makes a complete loop on the periphery of the lid 14. The preferred embodiment utilizes a two inch diameter cattle rub, although other size cattle rubs or applicators can be used.

As seen in FIG. 1, the lid 14 includes a plurality of slots 40 located a distance from the edge 42 of the lid 14. A webbing 44 is weaved through the slots 40 and around the cattle rub applicator 30. The number, size, shape and the width of the slots can be varied; however, the preferred embodiment contains twenty slots 40 which are approximately two inches wide. The webbing 44 preferably occupies a first slot 50, then wraps around a portion of the applicator 30, and then enters the next adjacent slot 40. The process is repeated until the webbing 44 again reaches the location of the first slot 50. At this point the two ends 55, 57 of the webbing 44 are attached to one another using a clamping mechanism 53. Preferably the clamping mechanism 53 can withstand at least 15,000 pounds of tensile strength. The mechanism 53 in the preferred embodiment is a metal bar on each side of an overlapping portion of the two ends of the webbing. A pair of bolts and corresponding screws are then used to fasten the webbing 44 in between the ends 55, 57 of the webbing 44.

In addition to the webbing 44, the preferred embodiment utilizes a second attachment mechanism 54 to better secure the applicator 30 to the lid 14. The second attachment mechanism 54 can be heavy duty zip ties. In the preferred embodiment, a heavy duty zip tie is used in conjunction with every fourth slot 40 on the lid 14. The zip tie is placed through a slot 40 and around the applicator 30.

The feed container 12 can also include one or more recesses 60 with a notched flange 62. Stakes (not shown) or other suitable mounting mechanisms can be driven through the notched flange 62 to secure the container 12 to the ground.

Figure 4:
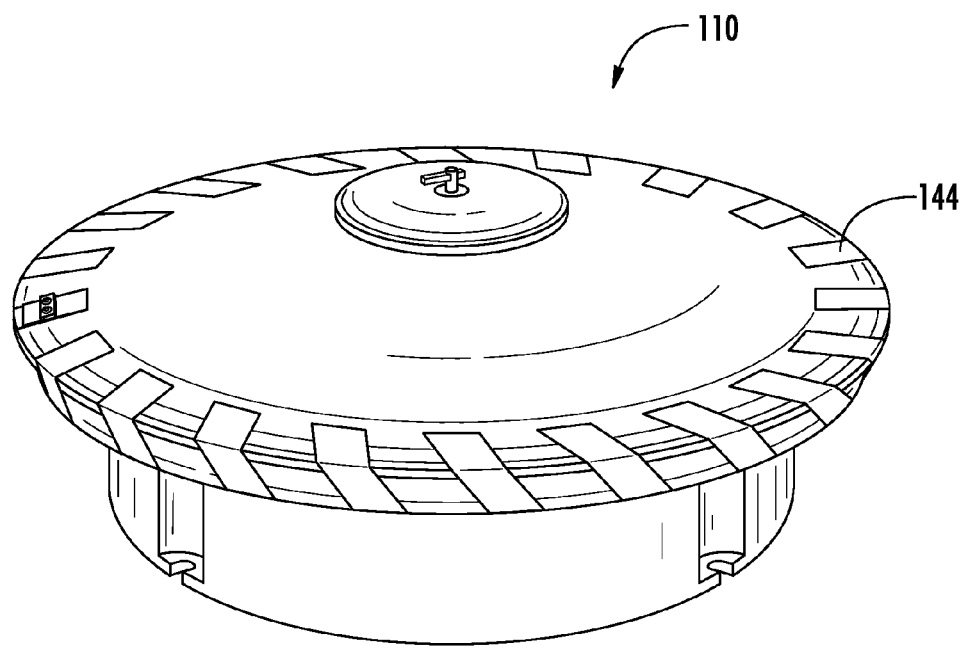
FIG. 4 shows a perspective view of a second embodiment of the invention.
Figure 5:
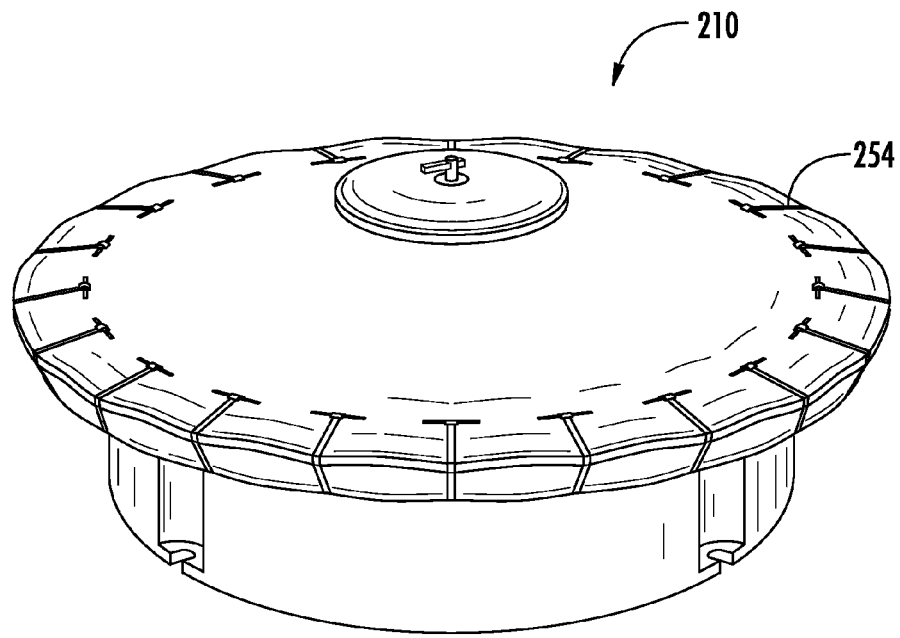
FIG. 5 shows a perspective view of a third embodiment of the invention.
Figure 7:
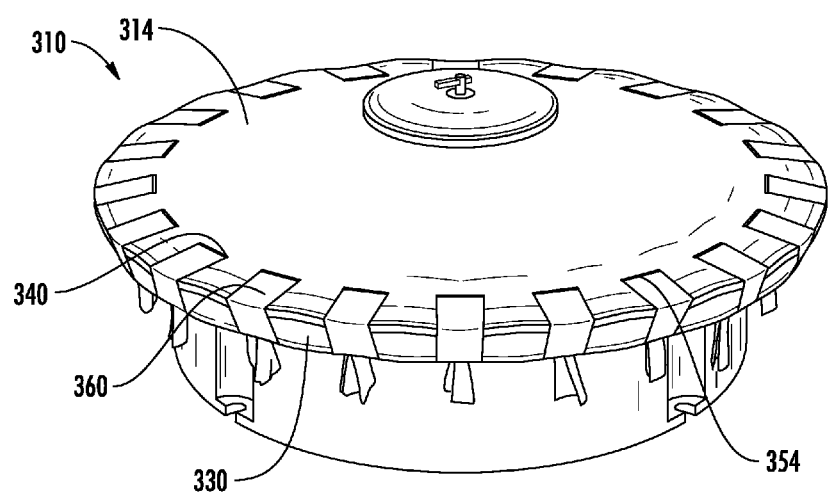
FIG. 7 shows a perspective view of a third embodiment of the invention.

FIGS. 4, 5, and 7 show different embodiments of the invention. FIG. 4 shows a combination feeder and pesticide applicator 110 with the same features of the preferred embodiment; however, this embodiment does not utilize the heavy duty zip ties only the webbing 144. Similarly, FIG. 5 shows an embodiment 210 which does not utilize the webbing, but instead utilizes only the heavy duty zip ties 254. FIG. 7 shows an embodiment 310 utilizing heavy duty zip ties 354. In addition, this embodiment utilizes cloth 360 which is inserted into each slot 340 and wrapped around the applicator 330. Preferably the cloth 360 is tied such that the ends 370 hang below the applicator 330. The cloth 360 is preferably the same material as the applicator 330. Insecticide and/or pesticide is applied to the cloth 360. The cloth 360 allows additional application of the insecticide/pesticide to an animal when the animal manipulates the lid 314.

Figure 6:
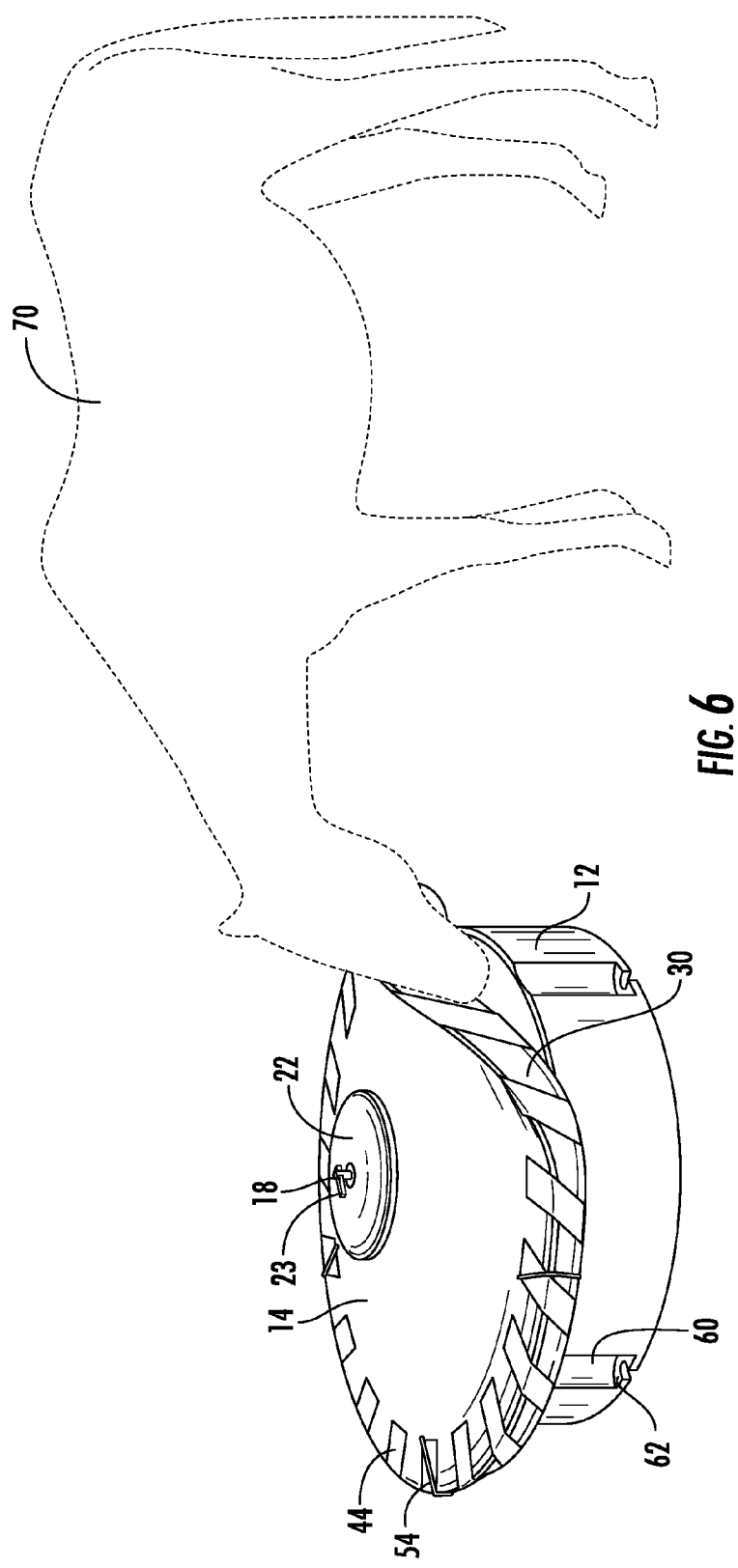
FIG. 6 shows the head of a an animal manipulating the invention.

Now referring to FIG. 6, an animal 70 is shown using the invention. As the animal 70 uses its head to lift a portion of the lid 14, the animal 70 makes contact with the applicator 30. In doing so, a portion of the pesticide is applied to the animal 70. Specifically, the pesticide is most likely to be applied to the face of the animal 70 where it is most effective against pests such as face flies. The link pin 18 and retainer 22 help maintain the lid 14 on the container 12 while the animal 70 lifts the periphery of the lid 14. Once lifted, the animal 70 can access food or other material within the container 12. After the animal 70 moves its head away from the container 12, the lid 14 assumes its original position over the container 12. The applicator 30 can be recharged with more of the same pesticide or with a different pesticide. Additionally, as parts wear out, such as the applicator 30, they can be replaced as the webbing 44 and second attachment mechanism 54 can be undone.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A combination feeder and pesticide applicator, comprising:
   a feeding compartment;
   a lid covering at least a portion of the feeding compartment;
   an applicator on the periphery of at least one of the lid and the feeding compartment;
   the applicator containing a pesticide;
   the applicator fastened to the lid;
   the applicator is a cattle rub;
   the lid is attached to the feeding compartment;
   the lid has a plurality of slots;
   a webbing is weaved through the plurality of slots;
   the webbing wraps around a portion of the cattle rub;
   wherein an animal receives an application of pesticide when manipulating the lid to expose the feeding compartment.

2. The combination feeder and pesticide applicator of claim 1, wherein:
   the lid is circular;
   the webbing has a first end and a second end;
   the first end of the webbing is attached to the second end of the webbing.

3. The combination feeder and pesticide applicator of claim 2, wherein:
   the cattle rub has a first end and a second end;
   the first end of the cattle rub is attached to the second end of the cattle rub.

4. The combination feeder and pesticide applicator of claim 3, wherein:
   a clamp connects the first end of the cattle rub to the second end of the cattle rub.

5. The combination feeder and pesticide applicator of claim 4, further comprising:
   a second attachment mechanism used in conjunction with the webbing.

6. The combination feeder and pesticide applicator of claim 5, wherein:
   the second attachment mechanism is at least one zip tie.

7. The combination feeder and pesticide applicator of claim 6, wherein:
   the pesticide can be periodically reapplied to the cattle rub.

8. The combination feeder and pesticide applicator of claim 7, wherein:
   the at least one zip tie wraps around a portion of the cattle rub;
   the at least one zip tie enters one of the plurality of slots.

9. A combination feeder and pesticide applicator, comprising:
   a feeding compartment;
   a lid attached to the feeding compartment;
   the lid covering the feeding compartment;
   a portion of the lid selectively movable to expose food in the feeding compartment;
   the lid having a plurality of slots;
   a cattle rub on the periphery of the lid;
   a webbing weaved through the plurality of slots securing the cattle rub;
   the cattle rub having a first end and a second end;
   the first end attached to the second end;
   the cattle rub having a pesticide;
   whereby an animal receives an application of pesticide when it manipulates the lid to eat the food in the feeding compartment.

10. The combination feeder and pesticide applicator of claim 9, wherein:
    the webbing has a first end and a second end;
    the first end of the webbing is attached to the second end of the webbing.

11. The combination feeder and pesticide applicator of claim 10, wherein:
    the cattle rub is further secured to the lid with a second attachment mechanism;
    the second attachment mechanism is a plurality of zip ties;
    each of the zip ties entering one of the slots on the lid.

* * * * *